United States Patent [19]
Nakano

[11] Patent Number: 5,499,840
[45] Date of Patent: Mar. 19, 1996

[54] AUTOMOTIVE SEAT WITH AIR-BAG

[75] Inventor: Nobuyuki Nakano, Ayase, Japan

[73] Assignee: Ikeda Bussan Co., Ltd., Ayase, Japan

[21] Appl. No.: 367,889

[22] Filed: Jan. 3, 1995

[30] Foreign Application Priority Data

Mar. 31, 1994 [JP] Japan ................................. 6-062579
Mar. 31, 1994 [JP] Japan ................................. 6-062580

[51] Int. Cl.$^6$ ............................................. B60R 21/22
[52] U.S. Cl. ................................ 280/730.1; 280/730.2
[58] Field of Search ........................... 280/730.1, 730.2

[56] References Cited

U.S. PATENT DOCUMENTS 3,779,577  12/1973  Wilfert ............................... 280/730.1
5,251,931  10/1993  Semchena et al. ................ 280/730.1

FOREIGN PATENT DOCUMENTS 4-50052   2/1992  Japan .

*Primary Examiner*—Kenneth R. Rice
*Attorney, Agent, or Firm*—Foley & Lardner

[57] ABSTRACT

1. A seat is mounted on a vehicle floor adjacent a side door. The seat comprises a seat base mounted on the floor and a seat back pivotally connected to the seat base. The seat back includes a seat back frame of metal, a horizontally extending reinforcing rod of metal secured to the seat back frame in such a manner that opposed ends thereof are projected laterally outwardly from two side portions of the seat back frame thereby to provide outwardly and inwardly projected portions, and a cushion pad covering both the seat back frame and the reinforcing rod so that the seat back has outside and inside lateral projections. The outwardly projected portion of the reinforcing rod extends toward the side door in closed condition. An air-bag unit is held by the outwardly projected portion of the reinforcing rod. The air-bag unit includes an air-bag which can be inflated between the seat back and the side door upon a vehicle collision.

13 Claims, 5 Drawing Sheets

5,499,840

AUTOMOTIVE SEAT WITH AIR-BAG

BACKGROUND OF THE INVENTION

1. Field of the Invention

The present invention relates in general to automotive seats, and more particularly, to automotive safety seats of a type which can protect a seat occupant from a vehicle collision, particularly, from a collision applied to a side of the associated vehicle. More specifically, the present invention is concerned with an automotive safety seat which is equipped with air-bags at lateral sides thereof.

2. Description of the Prior Art

For ease of description, a collision applied to the side wall (or side door) of a motor vehicle will be referred to as "side vehicle collision" in the following.

One of the automotive safety seats of the above-mentioned type is shown in Japanese Patent First Provisional Publication 4-50052. In the seat of this publication, an air-bag is mounted to an outer side of a seat back of the seat, so that upon a side vehicle collision, the air-bag is inflated between a seat occupant and an inwardly deformed side body or side door of the vehicle thereby protecting him or her.

SUMMARY OF THE INVENTION

It is an object of the present invention to provide an automotive seat having an air-bag mounted thereto, which, upon a side vehicle collision, can exhibit more assured protection of the seat occupant than the above-mentioned prior art seat.

According to a first aspect of the present invention, there is provided a combination in a motor vehicle having a body, a floor and a side door pivotally connected to the body. The combination comprises a seat mounted on the floor adjacent the side door, the seat including a seat base mounted on the floor and a seat back pivotally connected to the seat base, the seat back including a seat back frame of metal, a horizontally extending reinforcing rod of metal secured to the seat back frame in such a manner that opposed ends thereof are projected laterally outwardly from two side portions of the seat back frame thereby to provide outwardly and inwardly projected portions, and a cushion pad covering both the seat back frame and the reinforcing rod so that the seat back has outside and inside lateral projections, each having therein the corresponding projected portion of the reinforcing rod, the outwardly projected portion of the reinforcing rod extending toward the side door in closed condition; and an air-bag unit held by the outwardly projected portion of the reinforcing rod, the air-bag unit including an air-bag which can be inflated between the seat back and the side door upon a vehicle collision.

According to second aspect of the present invention, there is provided a combination in a motor vehicle having a body, a floor and first and second side doors pivotally connected to side walls of the body. The combination comprises first and second seats which are abreast arranged and mounted on the floor adjacent the first and second side doors respectively, each seat comprising a seat base mounted on the floor and a seat back pivotally connected to the seat base, the seat back including a seat back frame of metal, a horizontally extending reinforcing rod of metal secured to the seat back frame in such a manner that opposed ends thereof are projected laterally outwardly from two side portions of the seat back frame thereby to provide outwardly and inwardly projected portions, and a cushion pad covering both the seat back frame and the reinforcing rod so that the seat back has outside and inside lateral projections, each having therein the corresponding projected portion of the reinforcing rod, the outwardly projected portion of the reinforcing rod extending toward the side door in closed condition, and the inwardly projected portion of the reinforcing rod extending toward the inwardly projected portion of the reinforcing rod of the other seat; a first air-bag unit held by the outwardly projected portion of the reinforcing rod of the first seat; and a second air-bag unit held by the outwardly projected portion of the reinforcing rod of the second seat, wherein each of the first and second air-bag units includes an air-bag which can be inflated between the corresponding seat and the corresponding side door upon a vehicle collision.

BRIEF DESCRIPTION OF THE DRAWINGS

Other objects and advantages of the present invention will become apparent from the following description when taken in conjunction with the accompanying drawings, in which:

FIGS. 1 to 5 are drawings showing a first embodiment of the present invention, in which:

FIG. 1 is a sectional view of two abreast arranged front seats (viz., driver's seat and front passenger's seat) to which the present invention is practically applied, the view being taken from the front of the seats;

FIG. 2 is a perspective view of the driver's seat;

FIG. 3 is a sectional view of an air-bag unit mounted to the driver's seat;

FIG. 4 is a front view of the two seats, showing one advantageous operation of the first embodiment upon a side vehicle collision; and FIG. 5 is a view similar to FIG. 4, but showing an advantageous operation achieved by a modification of the first embodiment;

FIGS. 6 and 7 are drawings showing a second embodiment of the present invention, in which:

FIG. 6 is a sectional view of two abreast arranged front seats (viz., driver's seat and front passenger's seat) to which the present invention is practically applied, the view being taken from the front of the seats; and FIG. 7 is a perspective view of the driver's seat.

DETAILED DESCRIPTION OF THE EMBODIMENTS

Figure 1:
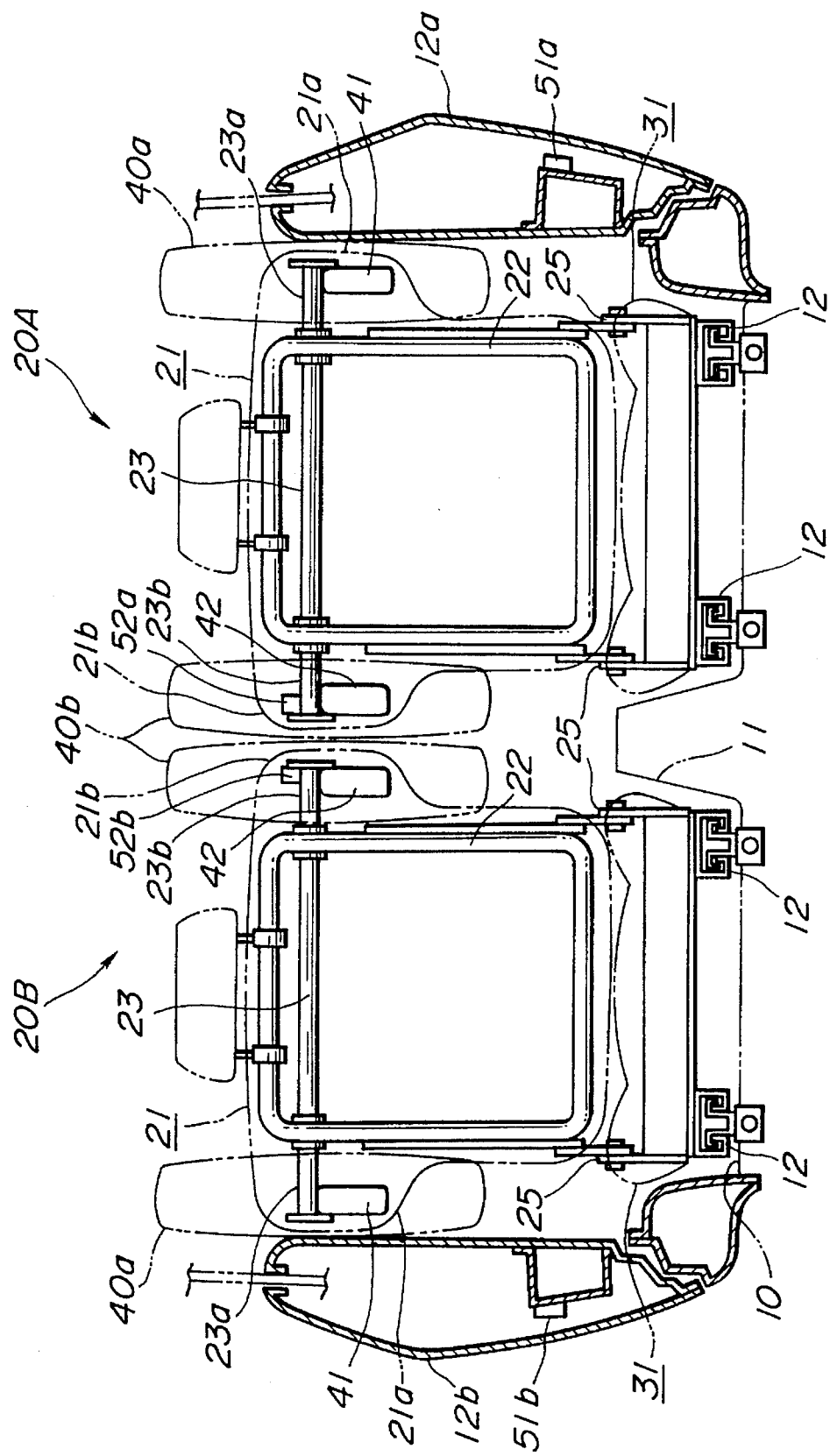

Referring to FIGS. 1 to 5, particularly FIG. 1, there are shown two abreast arranged front seats 20A and 20B (viz., driver's seat 20A and front passenger's seat 20B), to which the present invention is practically applied to constitute a first embodiment.

As is seen from the drawing, the seats 20A and 20B are abreast arranged on a vehicle floor 10 having a floor tunnel 11 put therebetween. The seats 20A and 20B are arranged to be symmetrical to each other. Designated by numerals 12a and 12b are left and right side doors of the vehicle, which are arranged to face outer sides of the respective seats 20A and 20B when closed.

Since the two seats 20A and 20B are substantially the same in construction except the reversed positioning of parts used therein, the following description will be directed to only the driver's seat 20A for facilitation of the description.

Each seat 20A (or 20B) comprises a seat base 31 which is mounted through rail units 12 on the vehicle floor 10 and a seat back 21 which is connected through reclining units 25 to a rear end of the seat base 31. Thus, the seat 20A (or 20B) can slide forward and rearward on the vehicle floor 10, and the seat back 21 can pivot forward and rearward relative to the seat base 31.

As is seen from FIG. 1, the seat back 21 of the seat 20A comprises a rectangular seat back frame 22 of metal, a cushion pad (illustrated by a phantom line) covering the frame 22 and a head rest (no numeral) secured to an upper part of the frame 22. The seat back frame 22 is pivotally connected through the reclining units 25 to a metal frame of the seat base 31.

A horizontally extending reinforcing rod 23 of metal is secured to side upper portions of the seat back frame 22 in such a manner that opposed ends thereof project laterally from the frame 22 to provide outwardly and inwardly projected portions 23a and 23b, as shown. Preferably, the reinforcing rod 23 is welded to the seat back frame 22.

Figure 2:
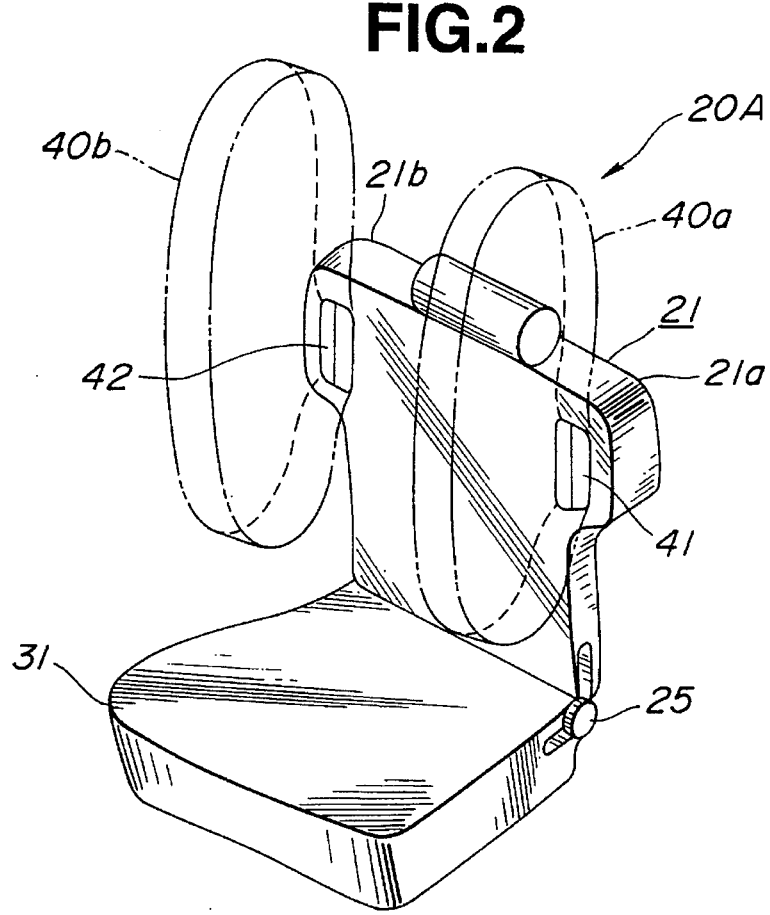

Thus, as will be seen from FIG. 2, the seat back 21 has at its upper portion outside and inside lateral projections 21a and 21b, each having the projected portion 23a or 23b of the reinforcing rod 23 received therein.

As is seen from FIG. 1, the outside lateral projection 21a projects toward the left door 12a, while, the inside lateral projection 21b projects toward the front passenger's seat 20B, more particularly, toward an inside lateral projection 21b of the front passenger' seat 20B. Thus, when, due to a side vehicle collision or the like, the left door 12a is inwardly deformed by a certain degree, the door 12a tends to abut against the outside lateral projection 21a transmitting the impact shock to the seat back 21 and at the same time the inside lateral projection 21b tends to abut against the inside lateral projection 21b of the front passenger's seat 20B. However, due to provision of the reinforcing rod 23, the upper portion of the seat back 21 can exhibit a sufficient resistance against such impact shock, and due to the same reason, the deformed door 12a is prevented from entering the passenger cabin.

As is understood from FIGS. 1 and 2, the reinforcing rod 23 is equipped at the outwardly and inwardly projected portions 23a and 23b thereof with outside and inside air-bag units 41 and 42, respectively.

Figure 3:
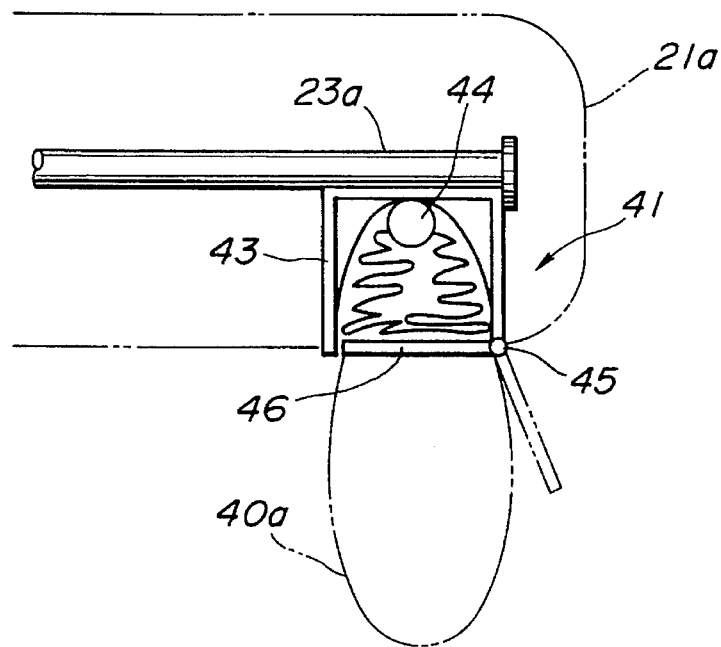

As is understood from FIGS. 2 and 3, each air-bag unit 41 or 42 comprises a air-bag case 43 secured to the reinforcing rod 23, a lid 46 pivotally connected to the case 43 through a hinge 45, a gas generator 44 installed in the case 43 and an air-bag 40a or 40b received in the case 43. As is seen from FIG. 2, the lateral projections 21a and 21b of the seat back 21 are formed at their front sides with openings (no numeral) to which the hinged lids 46 of the air-bag units 41 and 42 are exposed.

As will be described hereinafter, when energized due to a side vehicle collision, the gas generator 44 generates a gas for instantly inflating the air-bag 40a. Upon this, the inflated air-bag 40a instantly opens the lid 46 and instantly projects outwardly through the opening of the lateral projection 21a or 21b of the seat back 21. Thus, as is understood from the drawings, upon the collision, the air-bag 40a of the outside air-bag unit 41 is inflated between the door 12a and a seat occupant and the air-bag 40b of the inside air-bag unit 42 is inflated between the seat occupant and the seat back 21 of the adjacent seat 20B. It is to be noted that each air-bag 40a or 40b is so sized as to protect at least the head and breast portions of the seat occupant.

As is shown in FIG. 1, within the doors 12a and 12b, there are installed first collision sensors 51a and 51b. The sensor 51a and 52b are of a type which can detect a side vehicle collision, that is, a collision shock applied to the doors 12a and 12b. One of the sensors 51a and 51b are of a type which comprises a cylinder, a magnet installed in one end of the cylinder, an iron ball attached to the magnet and spaced terminal ends of an electric circuit installed in the other end of the cylinder. When the cylinder is applied with a certain shock, the iron ball is released from the magnet due to inertia force and brought into contact with the spaced terminal ends of the circuit to complete the circuit. Although not shown in the drawings, a conventional control unit is employed, which, upon the sensor 51a or 51b detecting the vehicle collision, energizes the gas generator 44 for inflation of the air-bag 40a.

Within the inside lateral projections 21a of the seat backs 21 of the two seats 20A and 20B, there are installed second collision sensors 52a and 52b. These sensors 52a and 52b are of a type which can detect a hard collision of the inside lateral projection 21b of the seat 20A against the inside lateral projection 21b of the other seat 20B. Because the movement of the reinforcing rod 23 is effected after the side door 12a or 12b abuts against the outside lateral projection 21a, the second sensor 52a or 52b is forced to issue a signal slightly after the first sensor 51a or 51b issues a collision signal.

In the following, advantageous operation of the seat 20A or 20B will be described with reference to FIG. 4.

Figure 4:
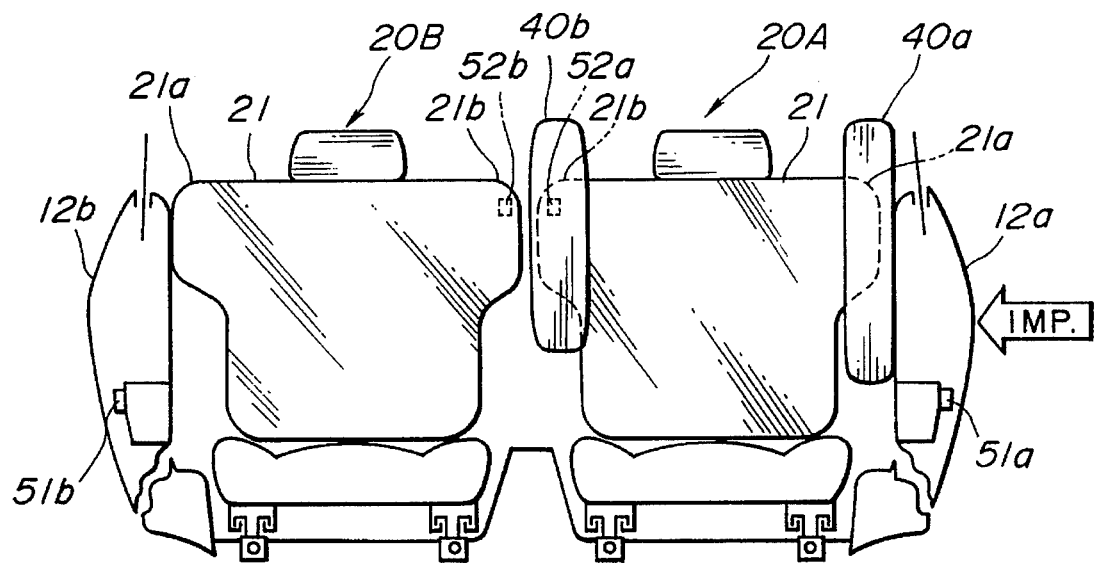

As is seen from FIG. 4, when, due to a left side vehicle collision, a big impact force is applied to the left side door 12a, the door 12a is deformed inwardly. However, due to provision of the outside lateral projection 21a possessed by the driver's seat 20A, the door 12a is prevented from severely entering the passenger room leaving a certain space between a seat occupant (viz., driver) and the deformed door 12a.

Upon this collision, the collision sensor 51a installed in the left side door 12a senses the collision and thus instantly inflates the air-bag 40a of the outside air-bag unit 41 through the gas generator 44. Because the certain space has been left between the seat occupant and the deformed door 12a for the above-mentioned reason, the air-bag 40a can be sufficiently inflated in such space and thus the air-bag 40a can effectively protect the seat occupant.

Due to collision of the left side door 12a against the outside lateral projection 21a of the driver's seat 20A, the reinforcing rod 23 of the seat 20A is forced to move inwardly causing a collision of the inside lateral projection 21b of the seat 20A against the projection 21b of the other seat 20B. Thus, undesired inward movement of the reinforcing rod 23, and thus, that of the driver's seat 20A is suppressed or at least minimized. The collision of the two inside lateral projections 21b is sensed by the second sensor 52a and thus the air-bag 40b of the inside air-bag unit 42 is instantly inflated through the gas generator 44. Because the inflation of the inside air-bag 40b is somewhat delayed as compared with that of the outside air-bag 40a due to the above-mentioned reason, a so-called "jack knife effect" of the seat occupant can be effectively damped by the inside air-bag 40b. Accordingly, even in such a side vehicle collision, the seat 20A can protect the seat occupant effectively.

When a right side vehicle collision occurs, the outside air-bag 40a of the right seat 20B is inflated first and the inside air-bag 40b of the same seat 20B is inflated next, in substantially the same manner as is mentioned hereinabove. Thus, the occupant on the right seat 20B is safely protected.

Figure 5:
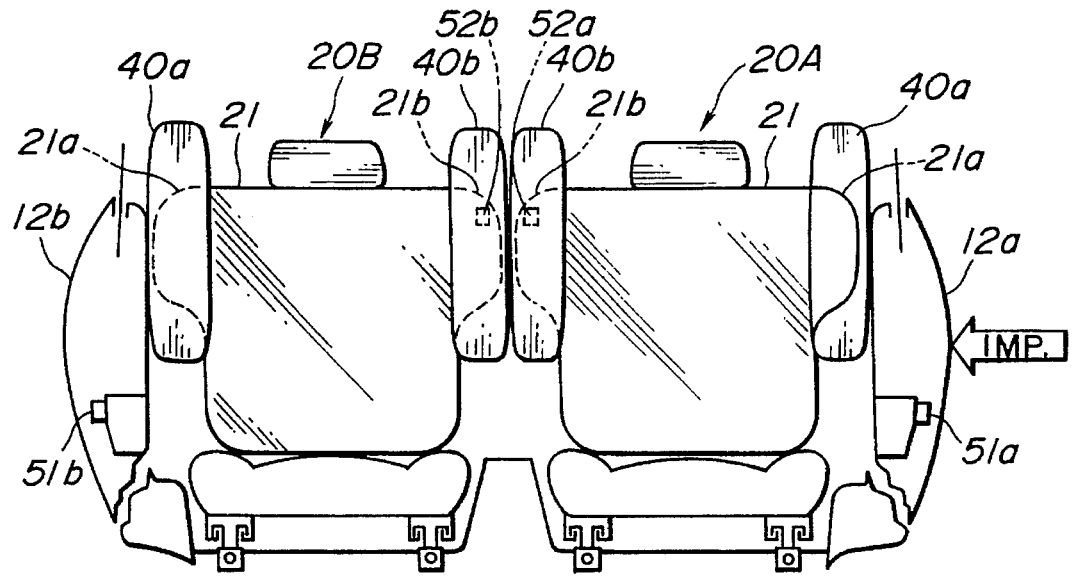

FIG. 5 shows an advantageous operation achieved by a modification of the first embodiment. In this modification, the four air-bag units 41 and 42 of the two seats 20A and 20B are controlled by a common control unit to which the four collision sensors 51a, 52a, 51b and 52b are all connected. The operation is as follows.

Upon a side vehicle collision applied to, for example, the left side door 12a, the outside air-bag 40a of the left seat 20A and the inside air-bag 40b of the right seat 20B are inflated first, and then the inside air-bag 40b of the left seat 20A and the outside air-bag 40a of the right seat 20B are inflated. When a side collision is applied to the right side door 12b, the outside air-bag 40a of the right seat 20B and the inside air-bag 40b of the left seat 20B are inflated first, and then the inside air-bag 40b of the right seat 20B and the outside air-bag 40a of the left seat 20A are inflated.

If desired, the second collision sensors 52a and 52b may be removed. However, in this case, an electric circuit is employed, which issues a signal for the delayed inflation of the air-bags after the first sensor 51a or 51b issues a signal.

Figure 6:
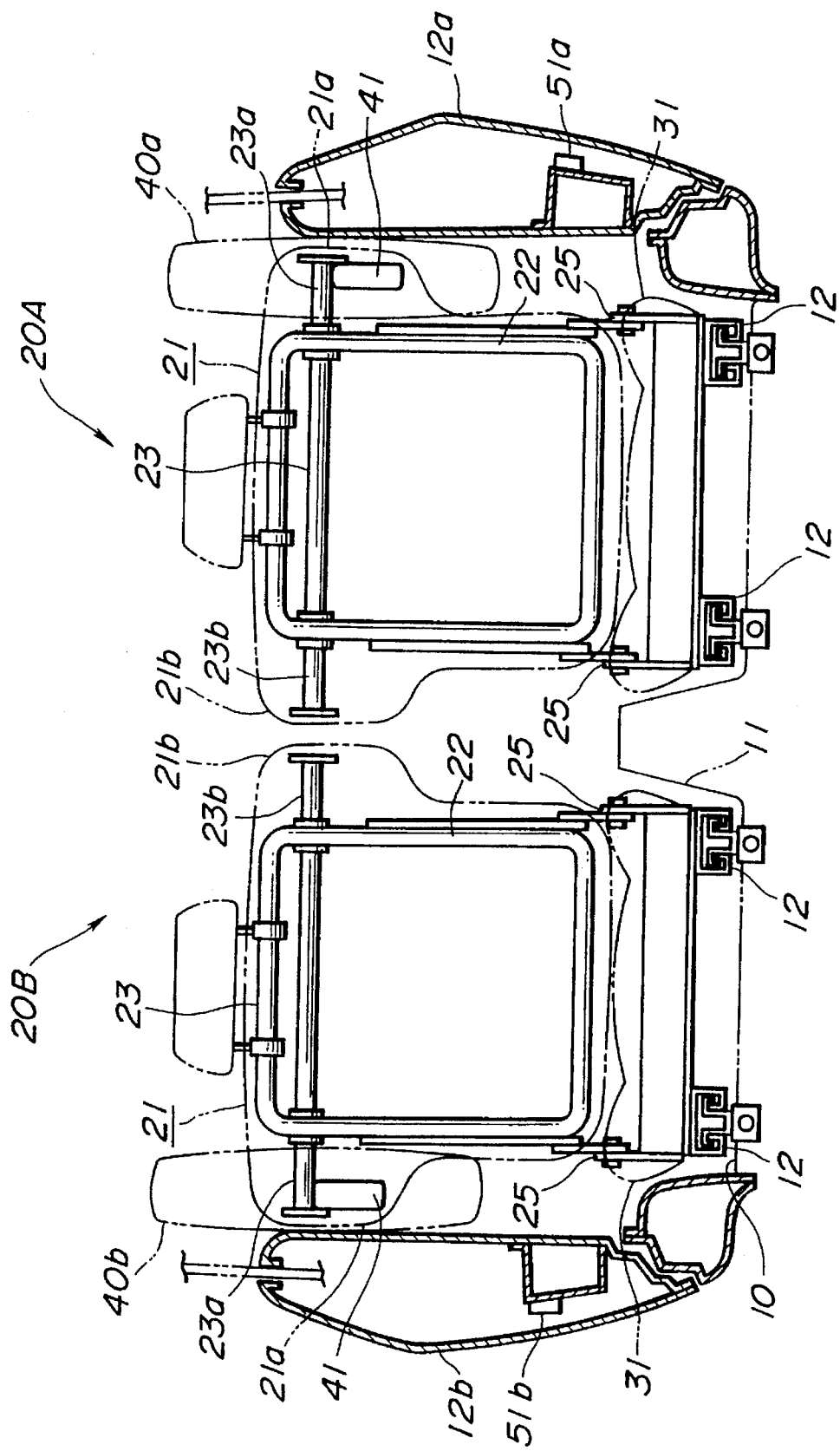
Figure 7:
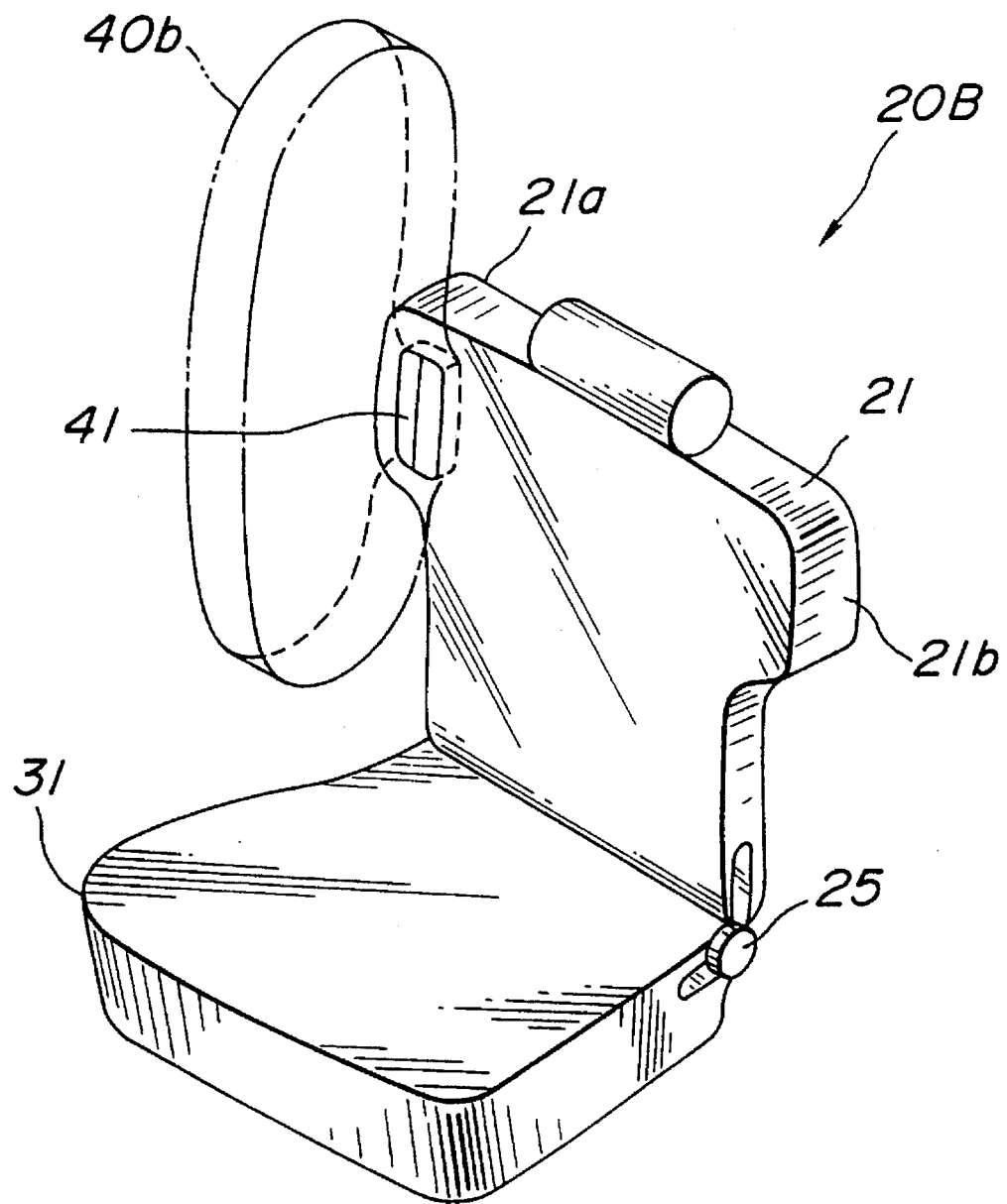

Referring to FIGS. 6 and 7, there is shown a second embodiment of the present invention.

As is understood from the drawings, this embodiment has no means which corresponds to the inside air-bag units 42 of the above-mentioned first embodiment.

Operation is as follows:

When, due to a left side vehicle collision, a big impact force is applied to the left side door 12a, the door 12a is deformed inwardly. However, to provision of the outside lateral projection 21a possessed by the driver's seat 20A, the door 12a is prevented from severely entering the passenger room leaving a certain space between a seat occupant (viz., driver) and the deformed door 12a.

Upon this collision, the collision sensor 51a installed in the left side door 12a senses the collision and thus instantly inflates the air-bag 40a of the outside air-bag unit 41. Because the certain space has been left between the seat occupant and the deformed door 12a, the air-bag 40a can be sufficiently inflated in such space and thus the air-bag 40a can safely protect the seat occupant.

Due to collision of the left side door 12a against the outside lateral projection 21a of the driver's seat 20A, the reinforcing rod 23 of the seat 20A is formed to move inwardly causing a collision of the inside lateral projection 21b of the seat 20A against the projection 21b of the other seat 20B. Thus, undesired inward movement of the reinforcing rod 23, and thus, that of the driver's seat 20A is suppressed or at least minimized.

Similar advantageous operation takes place in case of a right side vehicle collision. In this case, the outside air-bag 40b of the right seat 20B is inflated for protecting the front passenger.

If desired, the two air-bag units 41 may be controlled by a common control unit to which the two collision sensors 51a and 51b are connected. In this modification, the two air-bags 40a and 40b are both inflated upon a side vehicle collision.

What is claimed is:

1. In a motor vehicle having a body, a floor and a side door pivotally connected to said body, a seat mounted on said floor adjacent said side door, said seat comprising a seat base mounted on said floor and a seat back pivotally connected to said seat base, said seat back including a seat back frame of metal, a horizontally extending reinforcing rod of metal secured to said seat back frame in such a manner that opposed ends thereof are projected laterally outwardly from two side portions of the seat back frame thereby to provide outwardly and inwardly projected portions, and a cushion pad covering both the seat back frame and said reinforcing rod so that the seat back has outside and inside lateral projections, each having therein the corresponding projected portion of the reinforcing rod, said outwardly projected portion of the reinforcing rod extending toward said side door in closed condition; and an air-bag unit held by said outwardly projected portion of the reinforcing rod, said air-bag unit including an air-bag which can be inflated between the seat back and the side door upon a vehicle collision.

2. A combination as claimed in claim 1, further comprising:

a collision sensor installed in said side door for sensing a side vehicle collision applied to said side door; and a control unit for instantly inflating the air-bag of the air-bag unit upon receiving from said side collision sensor a signal representing the side vehicle collision.

3. A combination as claimed in claim 2, in which said outside lateral projection of said seat back is formed at its front side an opening through which said air-bag passes for its full inflation upon the side vehicle collision.

4. A combination as claimed in claim 1, in which said seat back frame is rectangular in shape and in which said reinforcing rod is welded to upper portions of the two side portions of said seat back frame.

5. A combination as claimed in claim 1, in which said seat back is connected to said seat base through a reclining mechanism.

6. A combination as claimed in claim 5, in which said seat is mounted on the vehicle floor through seat sliding units.

7. A combination as claimed in claim 1, further comprising another air-bag unit held by said inwardly projected portion of the reinforcing rod, said another air-bag unit including another air-bag which is inflated near said inside lateral projection upon the vehicle collision.

8. A combination as claimed in claim 7, further comprising:

a first collision sensor installed in said side door for sensing a side vehicle collision applied to said side door;

a second collision sensor installed in said inside lateral projection of the seat back, said second collision sensor being arranged to issue a collision signal slightly after the first collision sensor issues a collision signal; and a control unit for instantly inflating the air-bags of the two air-bag units upon receiving the collision signals from said first and second collision sensors.

9. In a motor vehicle having a body, a floor and first and second side doors pivotally connected to side walls of the body, first and second seats which are abreast arranged and mounted on said floor adjacent said first and second side doors respectively, each seat comprising a seat base mounted on said floor and a seat back pivotally connected to said seat base, said seat back including a seat back frame of metal, a horizontally extending reinforcing rod of metal secured to said seat back frame in such a manner that opposed ends thereof are projected laterally outwardly from two side portions of the seat back frame thereby to provide outwardly and inwardly projected portions, and a cushion pad covering both the seat back frame and said reinforcing rod so that the seat back has outside and inside lateral projections, each having therein the corresponding projected portion of the reinforcing rod, said outwardly projected portion of the reinforcing rod extending toward said side door in closed condition, and said inwardly projected portion of the reinforcing rod extending toward the inwardly projected portion of the reinforcing rod of the other seat;

a first air-bag unit held by the outwardly projected portion of the reinforcing rod of the first seat; and a second air-bag unit held by the outwardly projected portion of the reinforcing rod of the second seat, wherein each of said first and second air-bag units includes an air-bag which can be inflated between the corresponding seat and the corresponding side door upon a vehicle collision.

10. A combination as claimed in claim 9, further comprising:

a first collision sensor installed in said first side door for sensing a side vehicle collision applied to said first side door;

a second collision sensor installed in said second side door for sensing a side vehicle collision applied to the second side door;

a first control unit for instantly inflating the air-bag of the first air-bag unit upon receiving a collision representing signal from said first collision sensor; and a second control unit for instantly inflating the air-bag of the second air-bag unit upon receiving a collision representing signal from said second collision sensor.

11. A combination as claimed in claim 10, further comprising:

a third air-bag unit held by the inwardly projected portion of the reinforcing rod of the first seat; and a fourth air-bag unit held by the inwardly projected portion of the reinforcing rod of the second seat, wherein each of the third and fourth air-bag units includes an air-bag which can be inflated near the inside lateral projection of the seat back of the corresponding seat.

12. A combination as claimed in claim 11, further comprising:

a third collision sensor installed in the inside lateral projection of the seat back of the first seat; and a fourth collision sensor installed in the inside lateral projection of the seat back of the second seat, each of the third and fourth collision sensors being arranged to sense a collision between the inside lateral projections of the seat backs of the first and second seats, wherein said first control unit instantly inflating the air-bag of the third air-air bag unit upon receiving a collision representing signal from said third collision sensor, and wherein said second control unit instantly inflating the air-bag of the fourth air-bag unit upon receiving a collision representing signal from said fourth collision sensor.

13. A combination as claimed in claim 12, in which each of said third and fourth collision sensors is arranged to issue a collision representing signal slightly after the corresponding one of the first and second collision sensors issues a collision representing signal.

* * * * *